US006450196B1

(12) United States Patent
Bartos et al.

(10) Patent No.: US 6,450,196 B1
(45) Date of Patent: Sep. 17, 2002

(54) FLOAT VALVE

(75) Inventors: Josef A. Bartos, Pomona; Harsharan Grewal, Diamond Bar, both of CA (US)

(73) Assignee: GAAP Gas Controls LLC, Pomona, CA (US)

( * ) Notice: Subject to any disclaimer, the term of this patent is extended or adjusted under 35 U.S.C. 154(b) by 0 days.

(21) Appl. No.: 09/899,791

(22) Filed: Jul. 6, 2001

Related U.S. Application Data
(60) Provisional application No. 60/223,332, filed on Aug. 7, 2000.

(51) Int. Cl.[7] .................. F16K 31/34; F16K 31/385
(52) U.S. Cl. .................. 137/414; 137/430; 137/446; 137/449; 141/198
(58) Field of Search ................ 137/413, 414, 137/430, 446; 141/198

(56) References Cited

U.S. PATENT DOCUMENTS

| | | | | |
|---|---|---|---|---|
| 1,896,421 A | * | 2/1933 | Quivey | 137/430 |
| 2,213,753 A | * | 9/1940 | Teahen | 137/414 |
| 2,442,927 A | | 6/1948 | Horvath | |
| 2,491,521 A | * | 12/1949 | Samiran | 137/414 |
| 2,578,745 A | * | 12/1951 | Samiran | 137/414 |
| 2,620,818 A | | 12/1952 | Symmons | |
| 2,623,726 A | * | 12/1952 | Suska | 137/414 |
| 2,685,301 A | | 8/1954 | Dreier | |
| 2,811,169 A | * | 10/1957 | Buchanan | 137/414 |
| 2,843,145 A | * | 7/1958 | Koehler et al. | 137/414 |
| 2,855,949 A | * | 10/1958 | Sterner et al. | 137/414 |
| 2,975,798 A | * | 3/1961 | Jones | 137/449 |
| 3,429,333 A | | 2/1969 | Schoepe et al. | |
| 3,717,170 A | * | 2/1973 | McRae | 137/430 |
| 3,895,645 A | | 7/1975 | Johnson | |
| 3,929,155 A | * | 12/1975 | Garretson | 137/430 |
| 4,065,095 A | | 12/1977 | Johnson | |
| 4,305,422 A | * | 12/1981 | Bannink | 137/430 |
| 4,341,238 A | * | 7/1982 | Roosa et al. | 137/414 |
| 4,420,845 A | | 12/1983 | Antunez | |
| 4,444,230 A | * | 4/1984 | Van Mullem | 137/430 |
| 5,487,404 A | * | 1/1996 | Kerger | 137/446 |
| 5,685,331 A | * | 11/1997 | Westermeyer | 137/430 |
| 5,738,141 A | * | 4/1998 | Blanke et al. | 137/414 |
| 5,921,272 A | * | 7/1999 | Cavagna | 137/414 |
| 6,029,629 A | * | 2/2000 | Tipton | 137/449 |
| 6,076,546 A | | 6/2000 | Waters | |
| 6,138,709 A | * | 10/2000 | Home | 137/446 |
| 6,178,994 B1 | * | 1/2001 | Park | 137/446 |
| 6,230,730 B1 | * | 5/2001 | Garretson | 137/430 |
| 6,332,745 B1 | * | 12/2001 | Brougham | 137/430 |

FOREIGN PATENT DOCUMENTS

GB 138464 * 2/1920 ............ 137/430

* cited by examiner

*Primary Examiner*—George L. Walton
(74) *Attorney, Agent, or Firm*—Vickers, Daniels & Young

(57) ABSTRACT

A liquid level responsive shut-off valve for filling a tank, such as a toilet water tank, comprises a valve housing having an inlet passageway for connection to a source of liquid under pressure, an outlet passageway opening into the tank, and a diaphragm actuated valve element having open and closed positions respectively opening and closing the inlet passageway to the flow of liquid therethrough to said outlet passageway and the tank. A float and lever operated ball valve element controls operation of the diaphragm actuated valve element in accordance with the liquid level in the tank.

12 Claims, 3 Drawing Sheets

FLOAT VALVE

This application claims the benefit of the filing date of U.S. Provisional Patent Application Serial No. 60/223,332 filed Aug. 7, 2000 entitled Float Valve.

FIELD OF THE INVENTION

The invention relates to a valve assembly, and more particularly a valve assembly for a fluid receptacle to prevent the overfilling of the fluid receptacle.

BACKGROUND OF THE INVENTION

There have been a number of valves developed to control the water level in toilet flush tanks. One such design is a so-called ball cock type wherein a float is used to control the operation of the valve. Other types of valves utilize a diaphragm for comparing pressure resulting from water level with the atmospheric pressure. Other valves are designed wherein the atmospheric pressure is referenced through the wall of the flush tank rather than through a tube leading to the top of the tank. Several of these types of valves are illustrated in U.S. Pat. Nos. 2,442,927; 2,620,818; 2,685,301; 3,429,333; 3,895,645; 4,065,095; and 4,420,845, and are incorporated herein by reference.

SUMMARY OF THE INVENTION

The present invention pertains to an improved float type valve assembly which provides fluid level control, is simple to use, and produces little noise during operation. The valve assembly is particularly useful in maintaining fluid levels at a predetermined level and will be particularly described with reference thereto; however, the valve assembly has broader applications and can be used in a number of different devices that require fluid flow control. In one particular application, the valve assembly is used in a toilet to control and maintain a water level in the toilet flush tank. The valve assembly allows for fluid to flow into the toilet flush tank when the water level in the toilet flush tank is below a predetermined level. The valve assembly prevents fluid from flowing into the toilet flush tank when the water level in the toilet flush tank reaches a predetermined level, thereby preventing overfilling of the toilet flush tank.

In accordance with yet another aspect of the present invention, the valve assembly includes a valve member which shifts in a valve housing controlled by the rising of a float assembly while the fluid level in the tank rises. The valve member shifts into a blocking position relative to a port of the housing that communicates with the vessel interior at a predetermined maximum fluid level in the interior tank space. A fluid flow path is provided through the housing with the valve member moving in position between the flow path of the fluid and the port of the housing. When the fluid level in the tank is below a predetermined fluid level, the float assembly allows fluid to flow into the tank. In one embodiment, the valve assembly is designed such that the flow path is sized to permit a predetermined flow rate of fluid therethrough during filling operations.

In accordance with still another aspect of the present invention, the valve assembly is designed to be connected to a fluid line such as, but limited to, a water line in a toilet. The valve assembly includes a body affixed to the fluid line and has an interior space to provide a fluid passageway therethrough between the fluid line and the tank interior to allow the fluid to flow into the tank. In one embodiment, the valve assembly body is affixed to the fluid line to extend generally vertically to the interior of the tank. The fluid passageway of the body has an upper section, a lower section located below the upper section, and has a port at the bottom thereof with a portion of the body's interior space containing the valve member being between the fluid passageway section so when the tank fluid level reaches the predetermined level, the valve member properly moves to the blocking position to prevent further fluid loading in the tank interior.

It is accordingly an outstanding object of the present invention to provide an improved liquid level responsive valve for controlling the level of liquid in a vessel such as a toilet tank.

Another object is the provision of a valve of the foregoing character having improved float valve features for controlling liquid level.

A further object is the provision of a valve of the foregoing character which occupies a minimum amount of space in the liquid containing vessel.

Yet another object is the provision of a valve of the foregoing character which is economical to produce and efficient and quiet in operation.

BRIEF DESCRIPTION OF THE DRAWINGS

The foregoing objects, and others, will in part be obvious and in part pointed out more fully hereinafter in conjunction with the written description of a preferred embodiment of the present invention illustrated in the accompanying drawings in which.

DESCRIPTION OF PREFERRED EMBODIMENTS

Figure 1:
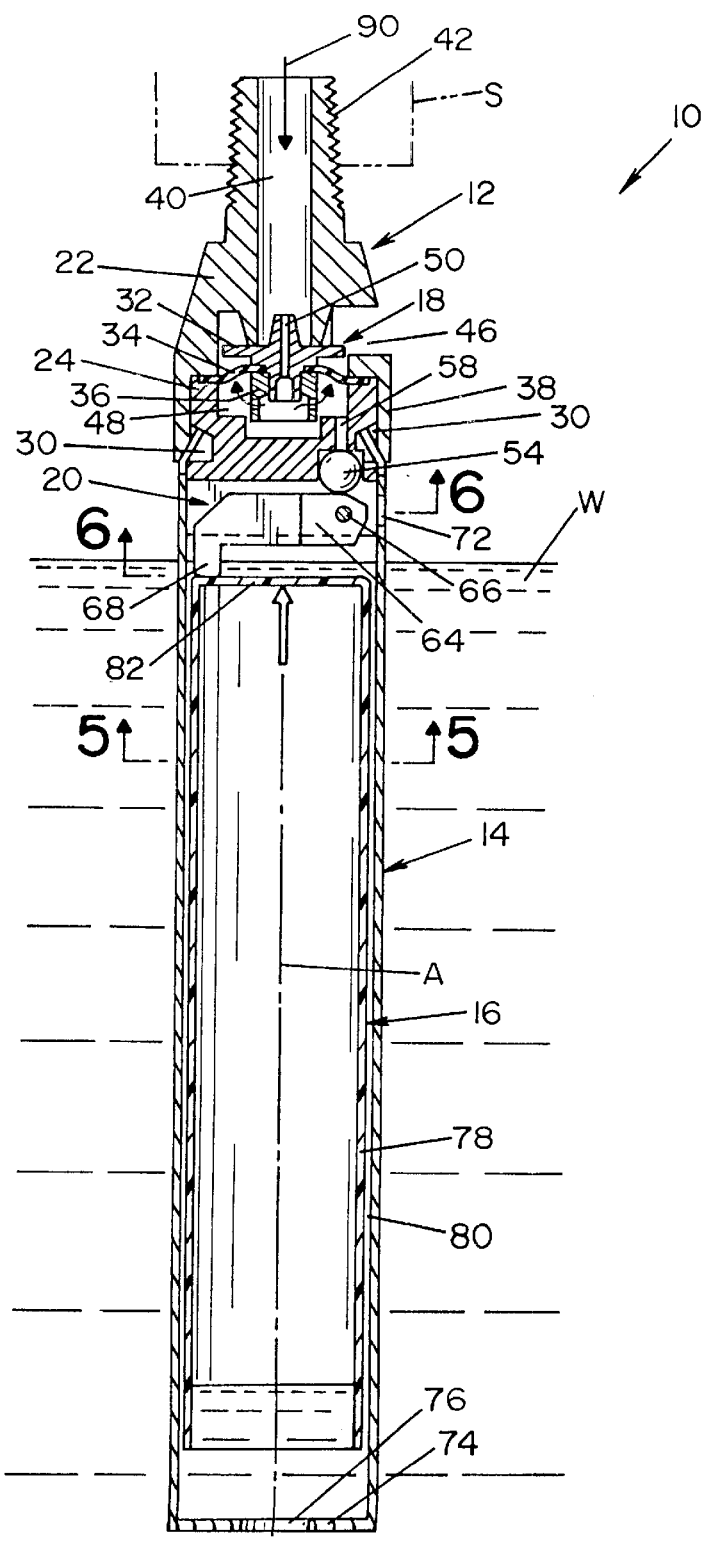
FIG. 1 is a cross-sectional elevation view of a float valve in accordance with the present invention and showing the valve closed.

Referring now in greater detail to the drawings wherein the showings are for the purpose of illustrating preferred embodiments of the invention only, and not for the purpose of limiting the invention, FIGS. 1–6 illustrate a float valve 10 in accordance with the invention having an axis A and comprising a valve body portion 12, a float retaining tube 14 secured thereto as set forth more fully hereinafter, a float member 16 in the retaining tube, a diaphragm actuated valve unit 18, and a float operated control valve unit 20. Valve assembly 10 is adapted to be mounted in a receptacle such as a toilet water tank, not shown in detail, containing water W.

Valve body portion 12 comprises an upper housing member 22 and a lower housing member 24 which interengage with the upper end of float retaining tube 14 to support the latter on the body portion. More particularly in this respect, the upper end of retaining tube 14 is provided with axially extending notches 26 spaced apart about the periphery thereof by axially extending fingers 28, and the lower end of housing member 24 is received in the upper end of retaining tube 14 and fingers 28 are bent inwardly to extend into a peripheral recess 30 in the lower housing member. The upper end of housing member 24 is received in an axially downwardly extending annular skirt 38 at the lower end of upper housing member 22, and the lower end of skirt 38 engages against fingers 28 to secure retaining tube 14 in place on body portion 12. Valve assembly 10 is adapted to be mounted in a receptacle such as a toilet water tank, not shown in detail, containing water W.

Figure 2:
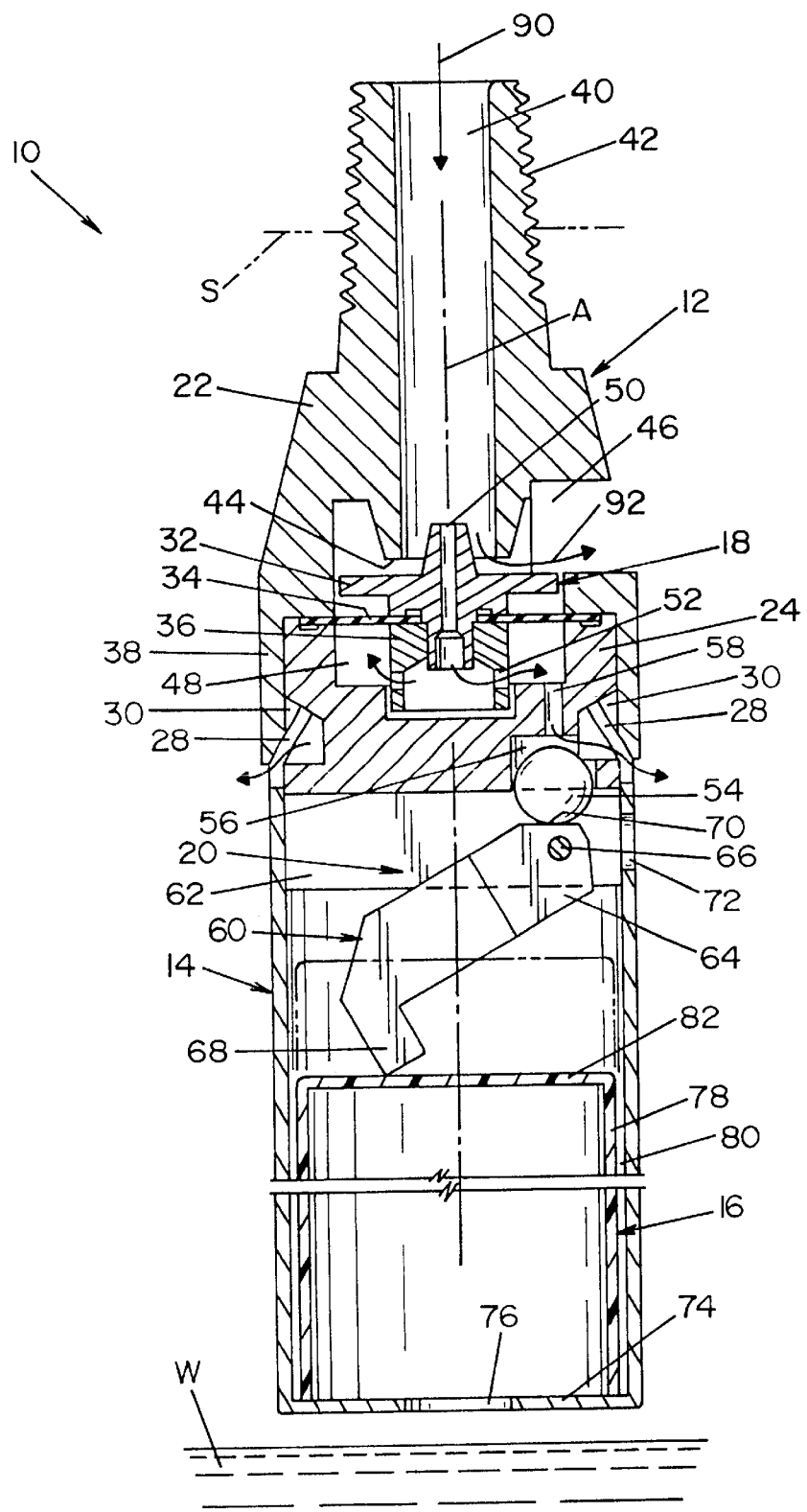
FIG. 2 is an enlarged sectional elevation view similar to FIG. 1 and showing the valve open.
Figure 4:
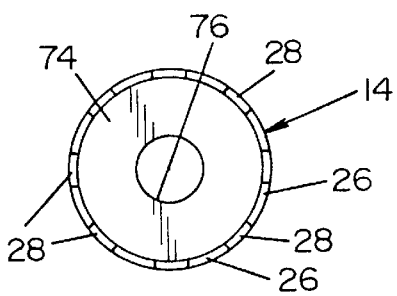
FIG. 4 is a plan view of the float retaining tube.
Figure 3:
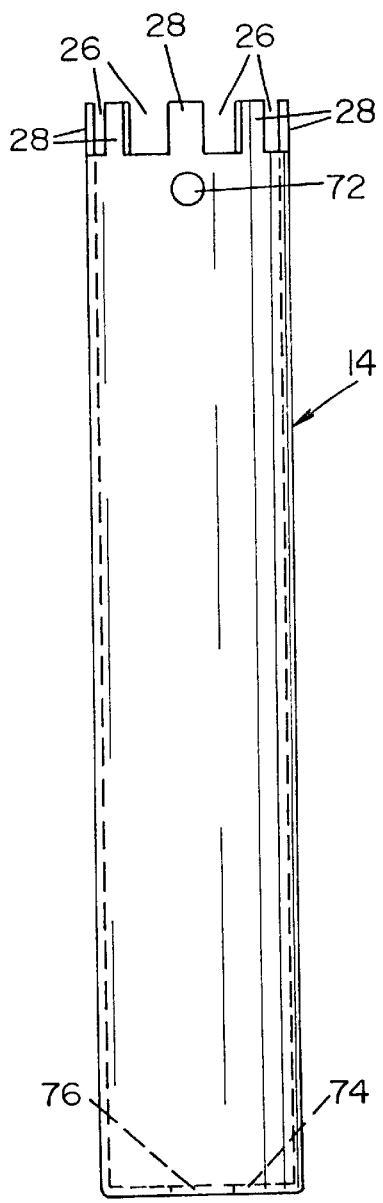
FIG. 3 is a side elevation view of the float retaining tube.
Figure 5:
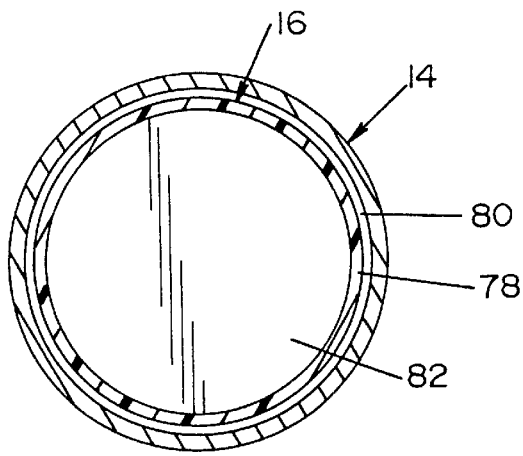
FIG. 5 is a cross-sectional view through the retaining tube and float taken along line 5—5 in FIG. 1.

As best seen in FIG. 2, diaphragm actuated valve unit 18 comprises a circular disk valve element 32 mounted on a flexible diaphragm 34 by means of a retainer 36 on the underside of the diaphragm, and the valve unit is mounted in valve body portion 12 by axially capturing the peripheral edge of diaphragm 34 between the upper and lower housing members 22 and 24. Upper housing member 22 is provided with an inlet passageway 40 coaxial with axis A of the valve assembly, and the upper end of housing member 22 is provided with external threads 42 for connecting the valve assembly to a water supply as designated by broken line S in FIGS. 1 and 2. The inner end of inlet passageway 40 terminates in a radially outwardly extending seat surface 44 for valve element 32, and upper housing member 22 is provided with an outlet port 46 opening radially outwardly thereof for the flow of water into the water tank as set forth more fully hereinafter. Lower housing member 24 is provided with a vent chamber 48 on the underside of diaphragm 34, and valve element 32 is provided with a control passageway 50 axially therethrough having an upper end communicating with inlet passageway 40 and a lower end communicating with vent chamber 48 through the open lower end of retainer 36 and ports 52 therein.

Figure 6:
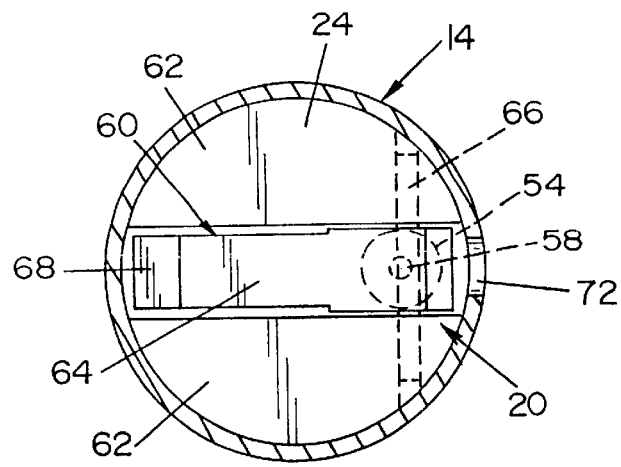
FIG. 6 is a cross-sectional view through the retaining tube taken along line 6—6 in FIG. 1; and, FIG. 7 is a cross-sectional view similar to FIG. 5 and showing an alternative float structure.

Float actuated valve unit 20 comprises a ball valve element 54 received in a recess 56 in the underside of lower housing member 24 and which recess intersects peripheral recess 30 in housing member 24 and is in flow communication with vent chamber 48 by means of a passageway 58 therebetween. Valve unit 20 further includes an operating lever 60 pivotally mounted between laterally spaced apart mounting block portions 62 which are integral with lower housing member 24 and, as best seen in FIG. 6, extend downwardly in float retaining tube 14 on laterally opposite sides of ball valve recess 56. Operating lever 60 includes a leg portion 64 having an end pivotally secured to mounting block portions 62 by a pivot pin 66 and having a nose end 68 spaced from pin 66 for slidably engaging with float 16 as the latter moves up and down in retaining tube 14. Leg 64 of lever 60 is provided with a cam surface 70 underlying ball 54. As will become apparent hereinafter, surface 70 is operable in response to pivotal displacement of lever 60 in opposite directions about pin 66 to displace ball valve element 54 between the closed and open positions of the ball valve relative to passage 58 shown in FIGS. 1 and 2, respectively.

The upper end of float retaining tube 14 is provided with a vent port 72 for the purpose set forth hereinafter, and the lower end of the retaining tube is provided with an end wall 74 having an opening 76 therethrough for the flow of water into and out of the retaining tube. Float member 16 is preferably made of nylon and comprises a cylindrical sidewall 78 having an outer diameter slightly less than the inner diameter of retaining tube 14 so as to provide an annular clearance 80 therebetween. The lower end of float 16 is open, and the upper end thereof is closed by an end wall 82 transverse to axis A and underlying nose 68 of lever arm 60 for interengagement therewith.

Figure 7:
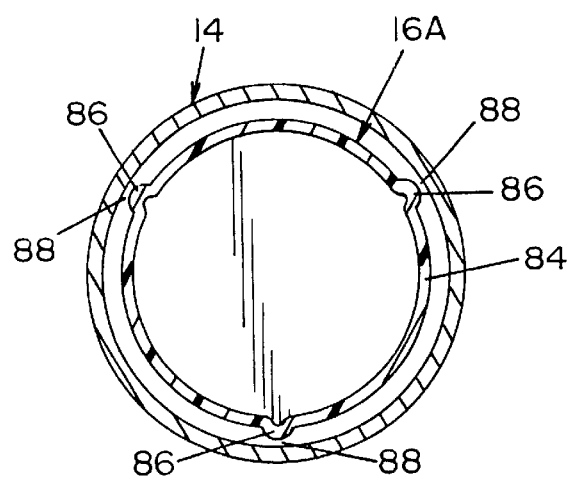

FIG. 7 illustrates an alternative structure for the float member, which is designated 16A in the latter Figure, and in which the cylindrical sidewall 84 of the float is of smaller diameter than wall 78 of float member 16 and is provided with a plurality of axially extending radially outwardly projecting ribs or nodes 86 providing a clearance 88 with the inner surface of float retaining tube 14. Ribs or nodes 86 minimize frictional interengagement between the float member and retaining tube and thus promote relative axial displacement therebetween with minimum interference. The ribs or nodes can be spaced apart along the length of wall 84 to minimize frictional interengagement with wall 84.

In use and operation, valve assembly 10 is mounted in a liquid reservoir such as the water tank of a toilet so as to be in a vertical disposition therein, and threaded end 42 of valve body portion 12 is connected to water supply lines. In the position of the component parts shown in FIG. 2, the valve assembly is open as it would be during the flow of water into the tank to fill the latter. More particularly in this respect, float member 16 is in the lowermost position thereof in retaining tube 14 and in which position cam surface 70 of lever arm 60 is positioned for ball valve element 54 to be spaced below passageway 58, whereby the latter is open to communicate vent chamber 48 with the water tank through recesses 56 and 30 in lower housing member 24. Accordingly, water under pressure flowing through entrance passageway 40 of the valve assembly displaces valve element 32 downwardly away from surface 44, whereby water entering passageway 40 flows into the water tank as indicated by arrows 90 and 92. During filling of the tank, a small amount of water flowing through inlet passageway 40 enters vent chamber 48 through passageway 50 in valve element 32 and ports 52 in retainer 36 and this water is vented into the water tank through passageway 58 and recesses 56 and 30 in lower valve body member 24. As the tank fills, water enters opening 76 in the bottom wall of retaining tube 14 and, together with air trapped in the float member, displaces the float member upwardly in the retaining tube. When the water reaches the appropriate level for shut off, end wall 82 of the float member has pivotally displaced lever 60 clockwise in FIG. 2 for cam surface 70 to displace ball valve 54 upwardly to close passageway 58 as shown in FIG. 1. Thereupon, the water flowing into chamber 48 through passageway 50 and ports 52 exerts a force against the underside of diaphragm 34 to displace valve element 32 upwardly against surface 44 to close the flow of water through inlet passageway 40 and, thus, to the tank.

It will be appreciated from the foregoing description that when the water tank is emptied, the water in the lower end of retaining tube 14 passes outwardly through opening 76 in the bottom wall thereof allowing float member 16 to descend in the retaining tube, whereupon lever 60 pivots counterclockwise in FIGS. 1 and 2 about pivot pin 66 and displaces cam surface 70 for ball valve element 54 to descend and open passageway 58. Thereupon, the water under pressure in vent chamber 48 is vented to the water tank through passageway 58 and recesses 56 and 30, and the reduced pressure in chamber 48 enables the water under pressure in inlet passageway 40 to displace valve element 32 downwardly to open the main valve for the flow of water into the water tank.

While considerable emphasis has been placed on preferred embodiments of the invention illustrated and described herein, it will be appreciated that many changes can be made in the preferred embodiments and that other embodiments can be devised without departing from the principals of the invention. Accordingly, it is to be distinctly understood that the foregoing descriptive matter is to be interpreted merely as illustrative of the invention and not as a limitation.

Having thus described the invention, it is so claimed:

1. A liquid level responsive flow control valve comprising a valve housing having a first end and an inlet passageway at said first end for connection to a source of liquid under pressure, said inlet passageway having an axis and an outlet end transverse to said axis, a diaphragm actuated valve element coaxial with said axis for opening and closing said outlet end, said housing including an outlet passageway laterally adjacent said downstream end for the flow of liquid from said housing when said outlet end of said inlet passageway is open, said diaphragm actuated valve element having a first side facing said outlet end of said inlet passageway and a second side opposite said first side, said housing including a liquid chamber on said second side coaxial with said axis and an outlet port laterally offset from said axis for the flow of liquid in said chamber from said housing, said diaphragm actuated valve element including a flow passageway between said first and second sides and having an inlet end in flow communication with said inlet passageway and an outlet end in flow communication with said liquid chamber, said housing having a second end spaced from said first end, a float retainer mounted on said second end of said housing coaxial with said axis and providing a float chamber having an inner end adjacent said second end of said housing, a tubular float member in said float chamber having an upper end facing said second end of said housing and having a lower end spaced from said upper end, a float operated lever having a first end pivotally mounted on said second end of said housing, said lever extending laterally in said float chamber between said upper end of said float member and said inner end of said float chamber and having a second end in sliding engagement with said upper end of said float, and a lever operated ball valve element in said second end of said valve housing overlying and engaging said first end of said lever, said fiat end having a surface operable in response to the position of said float in said float chamber to displace said ball valve element between open and closed positions for respectively opening and closing said outlet port to the flow of liquid from said liquid chamber through said outlet port, said ball valve element being in said closed position when said float is in a predetermined upper position in said float chamber, and said ball valve element being in said open position when said float descends from said upper position.

2. A valve according to claim 1, wherein said upper end of said float member is closed and said lower end is open.

3. A valve according to claim 1, wherein said float is made of nylon.

4. A valve according to claim 1, wherein said second end of said housing is cylindrical and includes a radially outwardly open peripheral recess, said float retainer being cylindrical and having an upper end including circumferentially spaced apart fingers received in said recess, and the spaces between said fingers providing a portion of said outlet port.

5. A valve according to claim 4, wherein said valve housing includes first and second valve body members, said second body member including said peripheral recess, and said first body member including a peripheral skirt portion axially overlying said recess and engaging said fingers in said recess.

6. A valve according to claim 5, wherein said upper end of said float member is closed and said lower end is open.

7. A valve according to claim 4, wherein said float is made of nylon.

8. A valve according to claim 1, wherein said valve housing includes first and second valve body members, said second body member including a lower end providing said second end of said valve housing, said lower end including a ball valve recess opening toward said inner end of said float chamber and having a recess axis parallel to and laterally offset from said axis of said inlet passageway, a recess port between said recess and said liquid chamber coaxial with said recess axis and providing a portion of said outlet port, said ball valve element being in said recess and displaceable therein by said lever to open and close said recess port.

9. A valve according to claim 8, wherein said lower end of said second body member includes lever mounting blocks extending into said inner end of said float chamber on laterally opposite sides of said ball valve recess, said lever being between said mounting blocks and having said first end pivotally secured thereto by a pivot pin underlying said ball valve recess.

10. A valve according to claim 8, wherein said second end of said housing is cylindrical and includes a radially outwardly open peripheral recess, said float retainer being cylindrical and having an upper end including circumferentially spaced apart fingers received in said recess, and the spaces between said fingers providing a portion of said outlet port.

11. A valve according to claim 10, wherein said second body member includes said peripheral recess and said first body member includes a peripheral skirt axially overlying said recess and engaging said fingers in said recess.

12. A valve according to claim 11, wherein said lower end of said second body member includes lever mounting blocks extending into said inner end of said float chamber on laterally opposite sides of said ball valve recess, said lever being between said mounting blocks and having said first end pivotally secured thereto by a pivot pin underlying said ball valve recess.

* * * * *